United States Patent
Ewald

[15] 3,651,745
[45] Mar. 28, 1972

[54] FLASH DEVICE FOR CINEMATOGRAPHIC CAMERA

[72] Inventor: William P. Ewald, Webster, N.Y.

[73] Assignee: Eastman Kodak Company, Rochester, N.Y.

[22] Filed: Apr. 28, 1969

[21] Appl. No.: 819,721

[52] U.S. Cl. ................................95/11.5, 240/1.3, 240/37.1, 352/169
[51] Int. Cl. .....................................G03b 21/38
[58] Field of Search ............... 352/137, 169, 199, 84; 95/11, 95/11.5

[56] References Cited

UNITED STATES PATENTS

| | | | |
|---|---|---|---|
| 2,552,250 | 5/1951 | Bornemann et al. | 95/11.5 X |
| 2,986,067 | 5/1961 | Gopeert et al. | 352/169 |
| 3,094,033 | 6/1963 | Thiele et al. | 352/169 |
| 3,200,721 | 8/1965 | Kiper et al. | 95/11.5 |
| 3,301,628 | 1/1967 | Hellmund | 352/169 X |
| 3,353,467 | 11/1967 | Ernisse et al. | 95/11.5 |
| 3,464,336 | 9/1969 | Rovsek | 352/137 X |
| 3,512,881 | 5/1970 | Kobota | 352/169 |

FOREIGN PATENTS OR APPLICATIONS 1,242,271  7/1967  Germany ................................352/169

*Primary Examiner*—John M. Horan
*Assistant Examiner*—Alan A. Mathews
*Attorney*—Robert W. Hampton and William C. Dixon, III

[57] ABSTRACT

In a cinematographic camera having a manually movable shutter-release member for effecting an exposure of a single frame of cinematographic film to take a still picture, a device is provided for using a flash-lamp unit to augment scene illumination.

The device comprises a socket for receiving a flash-lamp unit and means operatively connected to the shutter-release member for energizing the flash-lamp unit in synchronization with the exposure of a single frame of film.

In the preferred embodiment, the socket of the device is adapted to receive a flash-lamp unit having a plurality of flash lamps and is rotatable between a corresponding plurality of lamp-firing positions; and the device further comprises means for rotating the socket from one lamp-firing position to another in response to movement of the shutter-release member.

2 Claims, 7 Drawing Figures

PATENTED MAR 28 1972    3,651,745

WILLIAM P. EWALD
*INVENTOR.*

BY *William C. Dixon, III*

*Robert W. Hampton*
ATTORNEYS

WILLIAM P. EWALD
INVENTOR.

FLASH DEVICE FOR CINEMATOGRAPHIC CAMERA

BACKGROUND OF THE INVENTION

1. Field of the Invention

This invention relates generally to a cinematographic camera, and particularly to a cinematographic camera having means for exposing a single frame of film to take a still picture as well as means for exposing a sequence of frames to take a motion picture.

2. Description of the Prior Art

In cinematographic cameras having means for exposing a single frame of film to take a still picture as well as means for exposing a sequence of frames to take a motion picture, means for augmenting scene illumination are well known. Such means, popularly referred to as "movie lights", are intended primarily for use in exposing a sequence of frames to take a motion picture, and are only secondarily intended for use in exposing a single frame to take a still picture. For this reason, the movie lights known in the art are designed to provide continuous illumination of the subject being photographed, which illumination may on occasion be required for a considerable period of time. To provide the light output and life required of movie lights under such conditions, movie lights commonly have a power requirement of several hundred watts and are usually energized by being connected through a power cord to a standard 110-volt source of electrical potential or to a portable battery pack providing an electrical potential of approximately 30 volts. In either case, movie lighting units in common use today are characterized by being relatively large, heavy, and cumbersome in comparison with the camera with which they are used. While such a lighting system may be necessary to meet the illumination requirements of motion picture taking, such a system is grossly inefficient and unnecessarily cumbersome in meeting the requirements of still picture taking. For taking still pictures, movie lights pose the added disadvantage of illuminating the subject to be photographed before the still picture is to be taken, thereby possibly interfering with the natural appearance of the subject. For use in providing artificial illumination during the taking of a still picture, a much smaller lamp and an electrical source of much lower voltage generally suffice, as is well known in the still picture camera art. A simple, compact, self-contained, efficient, and inexpensive device for providing artificial illumination of the subject only during the taking of a still picture by a cinematographic camera is highly desirable. No such device is taught, shown, or suggested by the prior art known to applicant.

SUMMARY OF THE INVENTION

An object of the present invention is to provide a device for augmenting scene illumination during the taking of a still picture by a cinematographic camera.

Another object of the invention is to provide such a device using a flash-lamp unit to augment scene illumination.

Still another object is to provide such a device using a flash-lamp unit of the type having a plurality of flash lamps to augment scene illumination.

And a further object of the invention is to provide such a device that is simple, compact, self-contained, efficient, and inexpensive as compared with cinematographic camera lighting devices known heretofor.

To meet these and other objects, the present invention provides, in a cinematographic camera having means for effecting an exposure of a single frame of cinematographic film to take a still picture, a device for using a flash-lamp unit to augment scene illumination. The device comprises means for operatively supporting the flash-lamp unit and means operatively connected to the exposure effecting means for energizing the flash-lamp unit in synchronization with the exposure of the single frame of film. In the preferred embodiment of the invention, the means for supporting the flash-lamp unit includes a socket adapted to receive a flash-lamp unit having a plurality of flash lamps, the socket being rotatable between a corresponding plurality of lamp-firing positions, and the device further comprises means for rotating the socket from one lamp-firing position to another in response to operation of the exposure effecting means.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

Throughout FIGS. 1–7, like parts appearing in more than one figure are identified by like reference numerals.

DESCRIPTION OF THE PREFERRED EMBODIMENT

Because certain parts of cinematographic and related apparatus are well known, the following description is directed in particular to those elements forming, or cooperating directly with, the present invention, elements that are not specifically shown or described herein being understood to be selectable from those known in the art.

Figure 1:
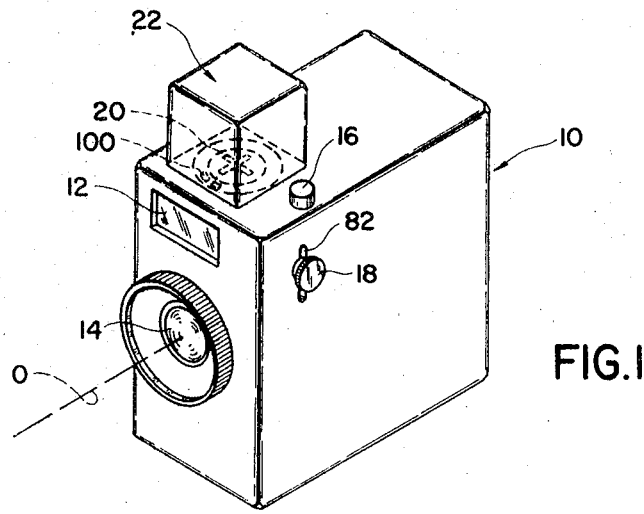
FIG. 1 is a perspective view of a cinematographic camera in which the device of the present invention is incorporated.

FIG. 1 of the drawings illustrates a cinematographic camera 10 in which the device of the present invention is incorporated. Included in camera 10 are a viewfinder 12, a picture-taking lens 14 for exposing film in the camera to scene light along an optical axis O, a shutter-release member 16 for operating a shutter (not shown) in the camera, a control knob 18 for setting the camera to effect exposure of either a single frame of film for a still picture or a sequence of frames of film for a motion picture, and a rotatable socket 20 for receiving a multilamp flash unit 22.

Figure 2:
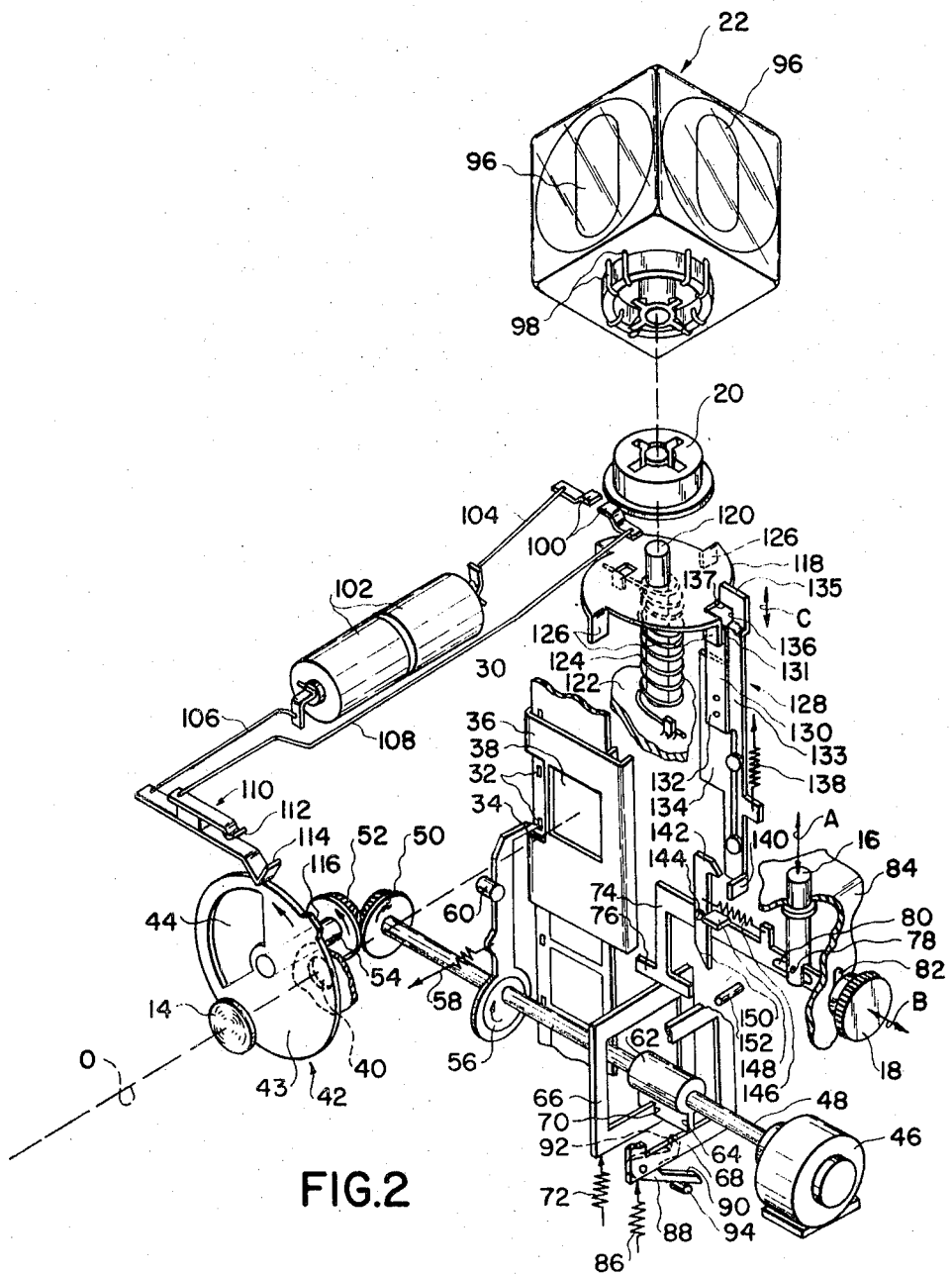
FIG. 2 is an enlarged, fragmentary view, in perspective, of the preferred embodiment of the present invention incorporated in the camera of FIG. 1.

FIG. 2 illustrates the preferred embodiment of the device of the present invention incorporated in the cinematographic camera of FIG. 1. Shown in FIG. 2 is a strip of film 30 having perforations 32 for receiving a film pulldown claw 34 for the purpose of advancing the film through a film gate 36 in a manner well known in the art. Included in gate 36 is an aperture 38 through which a frame of film 30 can be exposed to light admitted along optical axis O. Aligned with axis O is picture-taking lens 14, a lens aperture 40, and a shutter 42, which, as shown, is in the form of a rotatable disc 43 having a sector-shaped opening 44 that is movable by rotation of disc 43 into and out of alignment with axis O, the rotational axis of disc 43 being offset from axis O as shown.

Disc 43 is rotated by a motor 46, which may be either spring-operated or electrically operated, that is coupled to a shaft 48, a pair of mating bevel gears 50 and 52, and a shaft 54 on which disc 43 is mounted. As shown by the arrows, clockwise rotation of shaft 48 results in counterclockwise rotation of disc 43. Mounted on shaft 48 is an eccentric 56 which, upon rotation of shaft 48, provides the requisite movement of film pulldown claw 34 for advancing film 30 through gate 36. Coacting with film pulldown claw 34 is a spring 58 urging withdrawal of claw 34 from film 30 and a stop pin 60 limiting such withdrawal to the position shown. Secured to shaft 48 is a hub 62 having a portion 64 extending radially outwardly. Surrounding hub 62 are a pair of square-shaped frame members 66 and 68. Frame member 66 is provided with a slot 70 for receiving portion 64 of hub 62 when frame member 66 and hub 62 are positioned as shown, thereby retaining shaft 48 from rotation by motor 46. Urging frame member 66 in an upward direction, i.e., toward hub 62, is a spring 72.

Directly above frame member 66 is an actuating member 74 having an abutment portion 76 that is engageable with frame member 66. Actuating member 74 is movable both vertically, i.e., in the directions of arrow A, and laterally, i.e., in the directions of arrow B. Connected to member 74 by a pin 78 riding in a slot 80 is shutter-release member 16. The right end of member 74 extends through a vertical slot 82 in a camera wall 84, and has control knob 18 secured thereto. As may be seen, the camera operator's depression of shutter-release member 16 thus effects downward movement of actuating member 74, the engagement of abutment portion 76 with frame member 66, and consequent downward movement of frame member 66, against the influence of spring 72, to disengage frame member 66 from hub portion 64, thereby releasing shaft 48 for rotation by motor 46, such rotation continuing so long as shutter-release member 16 is held in its depressed position.

Movement of knob 18 to the right effects rightward movement of abutment portion 76, thereby placing portion 76 directly over both frame 66 and frame 68, so that depression of shutter-release member 16 will then result in downward movement of frames 66 and 68. Urging frame 68 in an upward direction is a spring 86, and pivotally connected to the lower-left corner of frame member 68 is generally Y-shaped latch member 88 having a pair of arms 90 and 92. Engaging the underside of arm 90 is a pin 94 fixed to the camera frame (not shown). Arm 92 is so disposed as to be in the path of movement of hub portion 64 when latch member 88 is rotated counterclockwise. As will be apparent, downward movement of frame member 68, against the biasing influence of spring 86, causes latch member 88 to be rotated counterclockwise by the coaction of arm 90 and pin 94, thereby moving arm 92 into the path of movement of hub portion 64 to prevent further rotation of shaft 48.

In operation, when knob 18 is pulled out, i.e., to the right, abutment portion 76 is in a position such that the camera operator's depression of shutter-release member 16 will effect downward movement of both frame member 66 and frame member 68. Latch member 88 is so disposed that, upon such downward movement of members 66 and 68, hub portion 64 will be released from slot 70 to permit commencement of rotation of shaft 48 before arm 92 is moved into the path of movement of hub portion 64, arm 92 then entering the path of movement of portion 64 during the first revolution of shaft 48, thereby limiting rotation of shaft 48 and disc 43 to a single revolution.

Shown in the upper portion of FIG. 2 is a socket 20 receiving multilamp flash unit 22, unit 22 having a plurality of individual flash lamps 96, each lamp having a pair of leads 98 depending therefrom. Upon insertion of flash unit 22 into socket 20, leads 98 are brought into engagement with a mating pair of electrical contacts 100 in the socket. Contacts 100 form part of a synchroflash circuit comprising a source of electrical potential such as batteries 102, conductors 104, 106, and 108, and a switch 110 connected as shown. Switch 110 has a pair of contacts 112 and 114, contact 114 being movable into engagement with contact 112. Shutter 42 is provided with a cam 116 on the periphery of disc 43 which follows a circular path of movement as disc 43 is rotated. Movable contact 114 is disposed in the path of movement of cam 116 so that cam 116, upon engaging contact 114, is operative to move contact 114 into engagement with contact 112 to thereby close switch 110 and ignite the connected lamp 96 of flash unit 22. Cam 116 is so located on the periphery of disc 43 as to effect the closing of switch 110 in synchronization with the movement of shutter opening 44 across optical axis O.

Socket 20 is secured to a socket base plate 118, both socket 20 and plate 118 being rotatably mounted on a shaft 120 which is fixed to a camera frame member 122. Means for rotating socket 20 and plate 118 are provided by a spring 124 secured at one end to frame member 122 and at the other end to plate 118. Spring 124, when energized, is operative to bias plate 118 and socket 20 in a clockwise direction, as viewed in FIG. 2. Spring 124 is energized by manually turning flash unit 22, when inserted in socket 20, in a counterclockwise direction, as will be explained more fully hereinafter.

Depending from appropriately spaced peripheral portions of plate 118 are a plurality of tabs 126 which form means for stopping rotation of plate 118 and socket 20 at a corresponding plurality of lamp-firing positions, tabs 126 being successively engageable with means 128 for retaining socket 20 in, and releasing socket 20 from, each lamp-firing position. Retaining and releasing means 128 is vertically movable, i.e., in the directions of arrow C, to perform the foregoing retaining and releasing functions. Included in means 128 is a resilient member 130 which has an upper edge 131 and which is fixed at its lower end 132 to the left side 133 of a rigid member 134. Rigid member 134 terminates in an upper end portion 135 that is L-shaped and offset as shown, a vertical edge 136 and a horizontal edge 137 thereof defining an opening through which tabs 126 are movable under certain conditions described below. The right side of resilient member 130 abuts against the left side 133 of rigid member 134 to render resilient member 130 substantially undeflectable to the right. However, resilient member 130 is readily deflectable to the left because of the absence of any restraining member on its left side.

In FIG. 2, retaining and releasing means 128 is shown in its uppermost position, hereinafter referred to as its first position. Means 128 is biased upwardly toward its first position by a spring 138. At the lower end of means 128 is a tab 140 which is engageable by a latch member 142 that is pivotally mounted, by a pin 144, on actuating member 74 as shown. Urging latch member 142 in a clockwise direction of rotation is a spring 146, and limiting the extent of such clockwise rotation is a tab 148 on member 74. The lower end of latch member 142 is provided with a bevel surface 150 which is engageable by a pin 152 fixed to the camera frame (not shown).

As illustrated in FIG. 2, a knob 18 and member 74 are in their leftmost positions, which constitute the positions suitable for exposing a sequence of frames of film to take a motion picture. As knob 18 is pulled out by the camera operator to move member 74 to its rightmost position, and thereby render the camera operable to effect a single-frame exposure, latch member 142 is also moved to the right for engagement with tab 140 upon downward movement of release member 16. In this manner, release member 16 and means 128 are coupled for simultaneous downward movement. Bevel surface 150 and pin 152 are so disposed that, after shaft 48 has been released to effect rotation of shutter disc 43 and ignition of the connected flashlamp 96, continued downward movement of member 74 causes bevel surface 150 to move against pin 152 and, by a camming action, to effect counterclockwise rotation of latch member 142 against the influence of spring 146. Such counterclockwise rotation of latch member 142 unlatches tab 140 and thereby releases means 128 for upward return movement to its first position under the influence of spring 138. Thus, with knob 18 pulled out, continuous downward movement of shutter-release member 16 effects an exposure of a single frame of film for the taking of a still picture, ignition of the connected flash lamp in synchronization with the single-frame exposure, and the return of socket retaining and releasing means 128 to permit rotation of socket 20 to its next lamp-firing position, as will be described more fully hereinafter.

Figure 3:
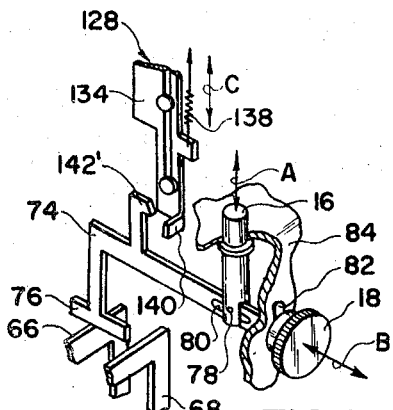
FIG. 3 is a partial view of the embodiment illustrated in FIG. 2, showing a modified form of the control mechanism therein.

Referring now to FIG. 3, a modified form of the control mechanism of the embodiment of FIG. 2 is shown wherein the pivotally mounted latch member 142 of FIG. 2 is replaced by a rigidly mounted latch member 142'. In this modified form, latch member 142' remains in the position in which it is set by the operator's positioning of knob 18, with the result that means 128 is returned upwardly to its first position, under the influence of spring 138, only upon release, and consequent upward return movement, of shutter-release member 16. In this form, then, depression of release member 16 effects only a single-frame exposure and a synchronized flash-lamp ignition, while release of member 16 effects upward return movement of means 128 and consequent rotation of socket 20 to its next lamp-firing position.

Figure 4:
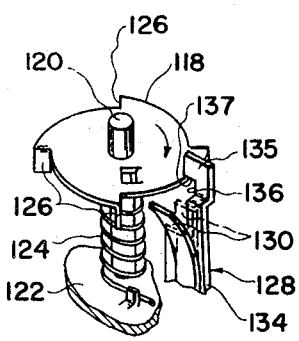
FIG. 4 is a partial view of the embodiment illustrated in FIG. 2, showing a portion of the socket retaining and releasing means in its upper position as it appears during reverse rotation of the flash-unit socket.

The action of socket retaining and releasing means 128 will now be described in detail with reference to FIGS. 4, 5, 6, and 7. FIG. 4 shows socket base plate 118 being rotated in a clockwise direction as a result of the operator's turning of flash unit 22 in socket 20 to energize spring 124. During this operation, socket retaining and releasing means 128 remains in its uppermost, or first, position, and edge 137 of portion 135 extends above the top surface of plate 118. Because resilient member 130 is readily deflectable to the left, tabs 126 are readily movable in a clockwise path through the opening defined by edges 136 and 137 of end portion 135, deflecting resilient member 130 to the left, as shown in FIG. 4, until tabs 126 pass over edge 131 of member 130. After each such deflection, member 130, because of its resilience, returns to its original, undeflected position, shown in FIG. 4 in broken lines. Such deflection and return of resilient member 130 continues upon successive engagements by tabs 126 until the operator stops turning socket 20.

Figure 5:
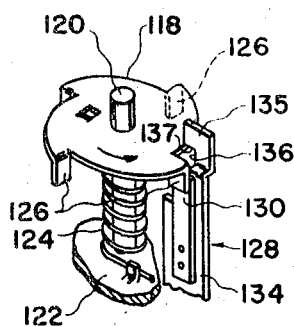
FIG. 5 is a partial view of the embodiment illustrated in FIG. 2, similar to FIG. 4 but showing the portion of the socket retaining and releasing means in its upper position while retaining the flash-unit socket in a lamp-firing position.

Referring now to FIG. 5, spring 124 is shown in an energized condition, and socket retaining and releasing means 128 is again shown in its uppermost, or first, position. One of the tabs 126, under the influence of spring 124, is held in engagement with resilient member 130, which is substantially undeflectable to the right, thereby retaining plate 118 and socket 20 in the corresponding lamp-firing position. Upon the camera operator's depression of release member 16, with knob 18 pulled out, as described above, socket retaining and releasing means 128 is moved downwardly to its lowermost, or second, position, shown in FIG. 6. Because of the offset configuration of upper end portion 135 of rigid member 134, during such downward movement of means 128 the tab 126 is caused to leave its engagement with resilient member 130 and, under the influence of spring 124, to move into engagement with end portion 135. The vertical dimension between the upper edge 131 of member 130 and edge 137 of end portion 135 is less than the vertical dimension of tab 126, so that tab 126 cannot pass under edge 137 after passing over edge 131. While plate 118 and socket 20 rotate clockwise a very small amount corresponding to the thickness of member 130 and the extent of the offset of end portion 135, such movement is not enough to prevent retention of socket 20 in substantially the same lamp-firing position.

Figure 6:
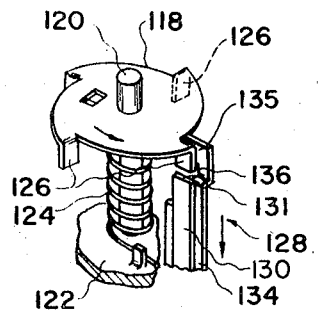
FIG. 6 is a partial view of the embodiment illustrated in FIG. 2, similar to FIG. 5 but showing the portion of the socket retaining and releasing means in its lower position while retaining the flash-unit socket in the lamp-firing position.
Figure 7:
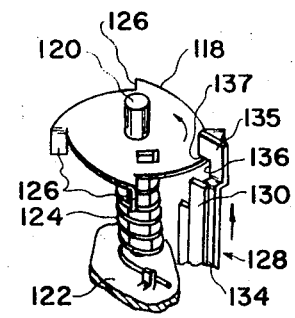
FIG. 7 is a partial view of the embodiment illustrated in FIG. 2, similar to FIGS. 5 and 6 but showing the portion of the socket retaining and releasing means in an intermediate position permitting flash-unit socket rotation from one lamp-firing position to another.

The position of tab 126 in engagement with end portion 135 while means 128 is in its second position is shown in FIG. 6. In this position, the left surface of tab 126 is slightly to the right of the right surface of member 130. As means 128 is moved back up from its second position toward its first position, and as portion 135 is thereby moved upwardly until edge 137 clears the top surface of plate 118, tab 126 having already cleared edge 131 of member 130, tab 126 is now free to pass under edge 137 in the clockwise direction through the opening defined by edges 136 and 137. Such clockwise movement of socket 20 continues until the next succeeding tab 126 moves into engagement with the left surface of resilient member 130 to retain socket 20 in the corresponding next succeeding lamp-firing position. FIG. 7 illustrates socket retaining and releasing means 128 in its intermediate, or third, position, in which tab 126 is released for clockwise rotation of socket 20 during upward movement of means 128 from its second position toward its first position.

It will thus be seen that an efficient means of effecting socket rotation from one lamp-firing position to another in response to movement of the shutter-release member has been achieved in the device of the present invention. Regardless of whether the device takes the form shown in FIG. 2 or that shown in FIG. 3, the socket retaining and releasing means is effective in retaining socket 20 in a lamp-firing position when means 128 is in its first and second positions and is effective in releasing socket 20 for rotation to the next lamp-firing position when means 128 is in its third position in response to movement thereof from its second position toward its first position. The offset configuration of the upper end portion 135 of rigid member 134, resulting in a staggered relationship of member 130 and end portion 135, provides a simple but effective means, in cooperation with tabs 126, for performing the foregoing retaining and releasing functions.

It will also be seen that the aforementioned objects of this invention have been achieved in that a device has been provided for augmenting scene illumination during the taking of a still picture by a cinematographic camera, the device using a flash-lamp unit which may have a plurality of flash lamps, the device being simple, compact, self-contained, efficient, and inexpensive as compared with cinematographic camera lighting devices known in the art.

The invention has been described in detail with particular reference to the preferred embodiment thereof, but it will be understood that variations and modifications can be effected within the spirit and scope of the invention.

I claim:

1. In a camera, the combination comprising:
   a shutter;
   means for effecting operation of said shutter, said means having a first condition and a second condition, in which first condition said shutter is operatable in repetitive motion picture operation and in which second condition said shutter is operatable for a single exposure;
   means for receiving a multilamp photoflash unit, said receiving means being movable for sequentially positioning the lamps of a received unit at a firing site;
   means for firing a lamp positioned at said firing site in timed relation with single exposure operation of said shutter;
   means for actuating said shutter operation effecting means when in said first and said second conditions;
   means for moving said flash unit receiving means in response to operation of said actuating means to position a new lamp to said firing site; and
   means for preventing operation of said moving means when said effecting means is in its first condition.

2. In a camera, the combination comprising:
   means for receiving cinematographic film;
   a film gate;
   means for continuously presenting continuous portions of received cinematographic film to said film gate for cinematographic exposure;
   shutter means for exposing said film;
   means for synchronizing said film presenting and exposing functions for motion picture operation of said camera;
   means for driving said shutter, said means being adjustable between a first condition and a second condition in which first condition said shutter is continuously driven for said motion picture operation and in which second condition said shutter is driven for a single exposure operation;
   means for receiving a multilamp photoflash unit, said receiving means being movable for sequentially positioning the lamps of a received unit at a firing site;
   means for firing a lamp positioned at said firing site in timed relation with single exposure operation of said shutter;
   means for actuating said shutter driving means when in its second condition;

means for moving said flash unit receiving means in timed relation to operation of said means for actuating said shutter driving means;

means for adjusting said shutter driving means between its first and second conditions; and means for preventing operation of said moving means when said shutter driving means is in its first condition.

* * * * *